(12) United States Patent
Huang (10) Patent No.: US 11,501,462 B2
(45) Date of Patent: Nov. 15, 2022

(54) MULTI-VIEW THREE-DIMENSIONAL POSITIONING

(71) Applicant: SONY CORPORATION, Tokyo (JP)

(72) Inventor: Sangxia Huang, Malmö (SE)

(73) Assignee: Sony Group Corporation, Tokyo (JP)

( * ) Notice: Subject to any disclaimer, the term of this patent is extended or adjusted under 35 U.S.C. 154(b) by 200 days.

(21) Appl. No.: 17/089,626

(22) Filed: Nov. 4, 2020

(65) Prior Publication Data

US 2021/0183098 A1  Jun. 17, 2021

(30) Foreign Application Priority Data

Dec. 13, 2019 (SE) .................................... 1951463-7

(51) Int. Cl.
| | |
|---|---|
| *G06K 9/62* | (2022.01) |
| *G06T 7/292* | (2017.01) |
| *G06T 7/593* | (2017.01) |
| *G06T 7/73* | (2017.01) |
| *G06V 10/75* | (2022.01) |
| *G06V 20/64* | (2022.01) |

(52) U.S. Cl.
CPC ................ *G06T 7/74* (2017.01); *G06T 7/292* (2017.01); *G06T 7/596* (2017.01); *G06V 20/647* (2022.01); *G06T 2207/30196* (2013.01)

(58) Field of Classification Search
None
See application file for complete search history.

(56) References Cited

U.S. PATENT DOCUMENTS 9,868,212 B1 * 1/2018 Hinterstoisser ........ B25J 9/1671
9,946,260 B2   4/2018 Shashua
(Continued)

FOREIGN PATENT DOCUMENTS

CN   101894267 B   7/2012
CN   109242950 A   1/2019
(Continued)

OTHER PUBLICATIONS

Amin et al., "Multi-view Pictorial Structures for 3D Human Pose Estimation," In Proceedings British Machine Vision Conference, 2013, pp. 45.1-45.12 (Year: 2013).*
(Continued)

*Primary Examiner* — Soo Shin
(74) *Attorney, Agent, or Firm* — Tucker Ellis LLP (57) ABSTRACT

A device determines positions of objects in a scene. The device obtains object detection data (ODD) which identifies the objects and locations of reference points of the objects in 2D images of the scene. The device processes the ODD to generate candidate association data (CAD) which associates pairs of objects between the images, computes estimated 3D positions in the scene for associated pairs of objects in the CAD, and performs clustering of the estimated positions. The device further generates, based on estimated 3D positions in one or more clusters, final association data (FAD) which associates one or more objects between the images, and computes one or more final 3D positions in the scene for one or more reference points of the one or more objects in the FAD. The final 3D position(s) represent the 3D position or the 3D pose of the respective object in the scene.

19 Claims, 7 Drawing Sheets

(56) References Cited

U.S. PATENT DOCUMENTS

| | | | |
|---|---|---|---|
| 11,404,145 B2* | 8/2022 | Saripalli | G16H 15/00 |
| 2012/0320162 A1 | 12/2012 | Lo et al. | |
| 2015/0010202 A1 | 1/2015 | Tuzel | |
| 2016/0292533 A1 | 10/2016 | Uchiyama | |
| 2017/0008521 A1 | 1/2017 | Braunstein | |
| 2018/0137386 A1 | 5/2018 | Cohen | |
| 2018/0253858 A1 | 9/2018 | Ni | |
| 2018/0308253 A1* | 10/2018 | Ryu | G06V 20/40 |
| 2018/0329484 A1 | 11/2018 | Steedly | |
| 2018/0374237 A1 | 12/2018 | Karlov | |
| 2019/0019030 A1 | 1/2019 | Cansizoglu | |
| 2019/0035099 A1* | 1/2019 | Ebrahimi Afrouzi | G06N 3/008 |
| 2020/0143561 A1* | 5/2020 | Hallett | G06T 7/13 |
| 2021/0304435 A1* | 9/2021 | Isberg | G06K 9/6218 |

FOREIGN PATENT DOCUMENTS

| | | |
|---|---|---|
| CN | 110020611 A | 7/2019 |
| EP | 2385483 A1 | 11/2011 |
| EP | 3012779 A1 | 4/2016 |
| JP | 5886594 B2 | 2/2016 |
| WO | 2016209420 A1 | 12/2016 |

OTHER PUBLICATIONS

Ershadi-Nasab et al., "Multiple human 3D pose estimation from multiview images," Multimed Tools Appl (2018) 77: 15573-15601 (Year: 2018).*

The Extended European Search Report from corresponding European Application No. 20205775.8, dated Mar. 15, 2021, 11 pages.

Swedish Office Action with Search Report for corresponding Swedish Application No. 1951463-7, dated Sep. 8, 2020, 8 pages.

Amin, S. et al., "Multi-view Pictorial Structures for 3D Human Pose Estimation"; BMVC, 2013, pp. 1-12.

Belagiannis, V. et al., "3D Pictorial Structures for Multiple Human Pose Estimation", CVPR, 2014, 8 pages.

Bridgeman, L. et al., "Multi-person 3D Pose Estimation and Tracking in Sports", CVPRW, 2019, 10 pages.

Ershadi-Nasab, S., et al., "Multiple human 3D pose estimation from multiview images", Multimedia Tools and Applications, Sep. 4, 2017, 29 pages.

Sun, K., et al., "Deep High-Resolution Representation Learning for Human Pose Estimation", Computer Vision Foundation, CVPR, 2019, 11 pages.

Tuytelaars, T., et al., "Local Invariant Feature Detectors: A Survey", Foundations and Trends Computer Graphics and Vision, vol. 3, Issue 3, 2007, 38 pages.

Xiao, B., et al., "Simple Baselines for Human Pose Estimation and Tracking", Computer Vision Foundation, ECCV, 2018, 16 pages.

* cited by examiner

FIG. 1A

| VIEW# | OBJECT# | KEYPOINT LOC |
|---|---|---|
| 1 | 1 | L1, L2, ..., L14 |
| 1 | 2 | L1, L2, ..., L14 |
| 1 | 3 | L1, L2, ..., L14 |
| 2 | 1 | L1, L2, ..., L14 |
| 2 | 2 | L1, L2, ..., L14 |
| 2 | 3 | L1, L2, ..., L14 |
| 3 | 1 | L1, L2, ..., L14 |
| 3 | 2 | L1, L2, ..., L14 |
| 3 | 3 | L1, L2, ..., L14 |

MULTI-VIEW THREE-DIMENSIONAL POSITIONING

RELATED APPLICATION DATA

This application claims the benefit of Swedish Patent Application No. 1951463-7, filed Dec. 13, 2019, the disclosure of which is incorporated herein by reference in its entirety.

TECHNICAL FIELD

The present disclosure relates generally to image processing for three-dimensional (3D) object recognition and positioning and, in particular, to such image processing based on image data representing multiple views of a scene.

BACKGROUND ART

Recovering the 3D position and the 3D pose of objects from images has been a long-standing problem in computer vision, where the objects may include inanimate objects or living organisms, or both. Techniques for 3D positioning and pose determination have a variety of applications such as 3D vision inspection, product assembly, goods inspection, human-computer interaction, video surveillance, sports broadcasting, industry robot control, navigation, etc.

One common solution is to use multiple cameras with overlapping fields of view, where the position and orientation of the cameras is known with reasonable accuracy, for example by measurement during installation. In operation, 3D positioning and pose determination typically comprises two stages: processing of individual video streams from the multiple cameras for detection of objects and keypoints of the respective object, and processing the detections to identify correspondence between detections of the same object in different views and calculating the position and/or pose of the respective object based on the correspondence between detections, and optionally temporal information. There are several established techniques for performing the first stage with good performance, for example by use of convolutional neural networks. However, the second stage poses a major challenge, i.e. to find cross-view correspondences between detected keypoints and objects. For example, crowding and occlusion of objects, as well as presence of noise, in the image data may make this task difficult.

Existing techniques for 3D positioning and pose determination have a number of shortcomings.

Many techniques are specific to the human pose and rely heavily on appearance features in the second stage. A good appearance model needs to be trained on a large number of annotated samples, increasing the barrier of adoption for such techniques. Further, such techniques will fail if plural objects have similar appearance.

An example is shown in US2018/0374237 which discloses a 3D pose determination technique for inanimate objects, for example 3D printed objects. The proposed technique requires a feature database to be prepared, the feature database comprising entries corresponding to different types of objects and different poses. During operation, feature vectors are extracted from images at different views and the feature database is queried by the extracted features, resulting in a set of matching entries for the respective view. To identify the object and its pose, the set of matching entries are clustered by object type and pose angle. The clusters are evaluated for selection of one cluster for each view, and the 3D pose is determined for the selected clusters. Clearly, the proposed technique is only applicable to objects with a known and fixed appearance.

Some proposed techniques use complicated inference models such as Conditional Random Fields (CRFs), which are challenging to optimize for real-time operation. Moreover, CRFs usually contain binary or higher-order potential terms that come from knowledge of the human body and requires additional data to achieve good performance. Examples of these techniques are found in the articles "Multi-view Pictorial Structures for 3D Human Pose Estimation", by Amin et al., published at BMVC 2013, and "3D Pictorial Structures for Multiple Human Pose Estimation", by Belagiannis et al., published at CVPR 2014.

There are also prior art techniques that achieve high efficiency by performing the second stage with a greedy algorithm. However, this makes these techniques less robust to inaccuracies in the detections produced by the first stage. An example of such a technique is found in the article "Multi-person 3D Pose Estimation and Tracking in Sports", by Bridgeman et al, published at CVPRW 2019. The technique is furthermore specific to human objects by the provision of human-specific heuristics for error correction.

The prior art also comprises U.S. Pat. No. 9,868,212, which does not aim to determine a 3D pose based on images of the object taken at different angles, but to process a dense cloud of 3D scene points to determine a 3D orientation of a rigid object. The 3D scene points may, for example, be generated by a 3D scanner. The proposed technique involves selecting a scene point pair, identifying a model point pair in a stored object model of the rigid object, generating a candidate in-plane rotation based on the model point pair and the scene point pair, and determining the 3D orientation of the object based on the generated candidate in-plane rotation and a model reference point of the model point pair.

There is a need for a robust and accurate technique for 3D positioning and pose determination of objects which is generally applicable irrespective of the type of the respective object, be it human or not.

BRIEF SUMMARY

It is an objective to at least partly overcome one or more limitations of the prior art.

Another objective is to provide a technique for determining a 3D position and/or 3D pose of one or more objects in a scene based on image data representing different views of the scene.

Yet another objective is to provide such a technique which is operable to determine the 3D position/pose based on object features identified in the image data and irrespective of the type of object.

A further objective is to provide a 3D position/pose determination technique which is processing efficient.

A yet further objective is to provide a 3D position/pose determination technique which is robust to occlusion and crowding in the image data.

One or more of these objectives, as well as further objectives that may appear from the description below, are at least partly achieved by a method, a computer-readable medium, a monitoring device, and a monitoring system according to the independent claims, embodiments thereof being defined by the dependent claims.

A first aspect of the present disclosure is a method of determining positioning of objects in a scene. The method comprises: obtaining object detection data corresponding to two-dimensional, 2D, images of the scene, said object detection data comprising an object identifier of a respective object in a respective 2D image among the 2D images of the scene and a location of a respective reference point of the respective object in the respective 2D image; processing the object detection data to generate candidate association data which associates pairs of objects between the 2D images of the scene; computing a plurality of estimated three-dimensional, 3D, positions in a scene coordinate system of the scene for associated pairs of objects in the candidate association data; determining one or more clusters of the plurality of estimated 3D positions; generating, based on estimated 3D positions in at least one cluster among the one or more clusters, final association data which associates one or more objects between the 2D images of the scene; and computing, based on the final association data, one or more final 3D positions in the scene coordinate system of the scene for one or more reference points of said one or more objects.

A second aspect of the present disclosure is a computer-readable medium comprising computer instructions which, when executed by a processing system, cause the processing system to perform the method of the first aspect or any of its embodiments.

A third aspect of the present disclosure is a monitoring device configured to determine positioning of objects in a scene. The monitoring device comprises logic configured to control the monitoring device to: obtain object detection data corresponding to two-dimensional, 2D, images of the scene, said object detection data comprising an object identifier of a respective object in a respective 2D image among the 2D images of the scene and a location of a respective reference point of the respective object in the respective 2D image; process the object detection data to generate candidate association data which associates objects between the 2D images of the scene; compute a plurality of estimated three-dimensional, 3D, positions in a scene coordinate system of the scene for associated objects in the candidate association data; determine one or more clusters of the plurality of estimated 3D positions; generate, based on estimated 3D positions in at least one cluster among the one or more clusters, final association data which associates one or more objects between the 2D images of the scene; and compute, based on the final association data, one or more final 3D positions in the scene coordinate system of the scene for one or more reference points of said one or more objects.

Any embodiment of the first aspect described herein may be adapted as an embodiment of the third aspect.

A fourth aspect of the present disclosure is a monitoring system, comprising: at least two imaging devices for distributed arrangement in relation to a scene and configured to produce two-dimensional, 2D, images of the scene; a processing device configured to receive and process the 2D images to generate object detection data corresponding to the 2D images of the scene; and the monitoring device in accordance with the third aspect of any of its embodiments.

The respective final 3D position that is computed by the foregoing aspects designate a 3D position of a reference point on an object in a scene. Thus, the aspects are operable to determine a 3D position of an object based on object features identified in 2D images representing different views of the scene. If more than one final 3D position is determined for an object at a time instance, the 3D pose of the object may be determined. The technique defined by the aspects is rendered robust and processing-efficient by the sequential processing of object detection data (comprising object identifiers and locations of reference points in the respective 2D image), candidate association data (which associates pairs of objects between 2D images), estimated 3D positions for associated pairs of objects, cluster(s) of estimated 3D positions, and final association data (which associates one or more objects between 2D images). For example, by going from the candidate association data to the final association data via a determination of one or more clusters among the estimated 3D positions, the technique is comparatively insensitive to reference points that are difficult or impossible to detect in some of the 2D images, for example as a result of occlusion or crowding, or inaccuracies in the object detection data, for example the location of some reference points. Further, the aspects are applicable to any type of object since they do not rely on a predefined feature database or object-specific heuristics. This versatility is, for example, attained by the clustering of estimated 3D positions and the determination of final association data based on the outcome of the clustering.

Still other objectives and aspects, as well as features, embodiments and technical effects will appear from the following detailed description, from the attached claims as well as from the drawings.

BRIEF DESCRIPTION OF DRAWINGS

Embodiments will now be described in more detail with reference to the accompanying schematic drawings.

DETAILED DESCRIPTION OF EXAMPLE EMBODIMENTS

Embodiments will now be described more fully hereinafter with reference to the accompanying drawings, in which some, but not all, embodiments are shown. Indeed, the subject of the present disclosure may be embodied in many different forms and should not be construed as limited to the embodiments set forth herein; rather, these embodiments are provided so that this disclosure may satisfy applicable legal requirements.

Also, it will be understood that, where possible, any of the advantages, features, functions, devices, and/or operational aspects of any of the embodiments described and/or contemplated herein may be included in any of the other embodiments described and/or contemplated herein, and/or vice versa. In addition, where possible, any terms expressed in the singular form herein are meant to also include the plural form and/or vice versa, unless explicitly stated otherwise. As used herein, "at least one" shall mean "one or more" and these phrases are intended to be interchangeable. Accordingly, the terms "a" and/or "an" shall mean "at least one" or "one or more", even though the phrase "one or more" or "at least one" is also used herein. As used herein, except where the context requires otherwise owing to express language or necessary implication, the word "comprise" or variations such as "comprises" or "comprising" is used in an inclusive sense, that is, to specify the presence of the stated features but not to preclude the presence or addition of further features in various embodiments. The term "compute", and derivatives thereof, is used in its conventional meaning and may be seen to involve performing a calculation involving one or more mathematical operations to produce a result, for example by use of a computer.

As used herein, the terms "multiple", "plural" and "plurality" are intended to imply provision of two or more elements, whereas the term a "set" of elements is intended to imply a provision of one or more elements. The term "and/or" includes any and all combinations of one or more of the associated listed elements.

It will furthermore be understood that, although the terms first, second, etc. may be used herein to describe various elements, these elements should not be limited by these terms. These terms are only used to distinguish one element from another. For example, a first element could be termed a second element, and, similarly, a second element could be termed a first element, without departing the scope of the present disclosure.

Well-known functions or constructions may not be described in detail for brevity and/or clarity. Unless otherwise defined, all terms (including technical and scientific terms) used herein have the same meaning as commonly understood by one of ordinary skill in the art to which this disclosure belongs.

Like numbers refer to like elements throughout.

Before describing embodiments in more detail, a few definitions will be given.

As used herein, "scene" denotes a three-dimensional (3D) space that is collectively monitored by two or more imaging devices. The imaging devices have at least partly overlapping fields of views. The respective imaging device may be configured to produce digital still images or a digital video stream, i.e. a coherent time-sequence of digital images. The respective image is a two-dimensional (2D) representation of the scene, or part thereof, as seen by the imaging device. The imaging device may comprise imaging optics, a digital image sensor responsive to electromagnetic radiation, and control electronics for acquiring signals from the digital image sensor and generating a digital image, which may be monochromatic or polychromatic. The respective imaging device may be responsive to electromagnetic radiation in any wavelength range, including but not limited to ultraviolet, visible or infrared radiation, or any part or combination thereof.

As used herein, "field of view" has its conventional meaning and denotes the extent of the scene that is observed by the respective imaging device at any given moment and may be defined as a solid angle through which the imaging device is sensitive to the electromagnetic radiation.

As used herein, "keypoint" has its conventional meaning in the field of computer vision and is also known as an interest point. A keypoint is a spatial location or point in an image that define what is interesting or what stand out in the image and may be defined to be invariant to image rotation, shrinkage, translation, distortion, etc. More generally, a keypoint may be denoted a "reference point" on an object to be detected in the image, with the reference point having a predefined placement on the object. Keypoints may be defined for a specific type of object, for example a human body, a part of the human body, or an inanimate object with a known structure or configuration. In the example of a human body, keypoints may identify one or more joints and/or extremities. Keypoints may be detected by use of any existing feature detection algorithm(s), for example image processing techniques that are operable to detect one or more of edges, corners, blobs, ridges, etc. in digital images. Non-limiting examples of feature detection algorithms comprise SIFT (Scale-Invariant Feature Transform), SURF (Speeded Up Robust Feature), FAST (Features from Accelerated Segment Test), SUSAN (Smallest Univalue Segment Assimilating Nucleus), Harris affine region detector, and ORB (Oriented FAST and Rotated BRIEF). Further information about conventional keypoint detectors is found in the article "Local invariant feature detectors: a survey", by Tuytelaars et al, published in Found. Trends. Comput. Graph. Vis. 3(3), 177-280 (2007). Further examples of feature detection algorithms are found in the articles "Simple Baselines for Human Pose Estimation and Tracking", by Xiao et al, published at ECCV 2018, and "Deep High-Resolution Representation Learning for Human Pose Estimation", by Sun et al, published at CVPR 2019. Correspondingly, objects may be detected in images by use of any existing object detection algorithm(s). Non-limiting examples include various machine learning-based approaches or deep learning-based approaches, such as Viola-Jones object detection framework, SIFT, HOG (Histogram of Oriented Gradients), Region Proposals (RCNN, Fast-RCNN, Faster-RCNN), SSD (Single Shot MultiBox Detector), You Only Look Once (YOLO, YOLO9000, YOLOv3), and RefineDet (Single-Shot Refinement Neural Network for Object Detection).

Embodiments are related to determining positioning of one or more objects in a scene based on a plurality of views of the scene, also known as a "multiview". The positioning may be 3D object positioning, which involves determining a single 3D position of a keypoint of the respective object in the scene, or 3D pose determination, which involves determining 3D positions of a plurality of keypoints of the respective object in the scene. The views may be digital images and may be produced by a fixed or non-fixed arrangement of imaging devices. The views represent different viewpoints onto the scene, or parts thereof, and the respective object is reproduced as a two-dimensional object in the respective view.

One technical challenge in this context is to handle occlusions in which an object is partially hidden in one or more views, for example behind another object, and/or crowding in which objects are in close vicinity to each other in one or more views. Another challenge may be to perform the positioning in a processing efficient way to save computing resources and, possibly, to enable real-time processing. Such real-time processing may, for example, enable real-time tracking of objects and 3D positions based on video streams from the imaging devices.

Figure 1A:
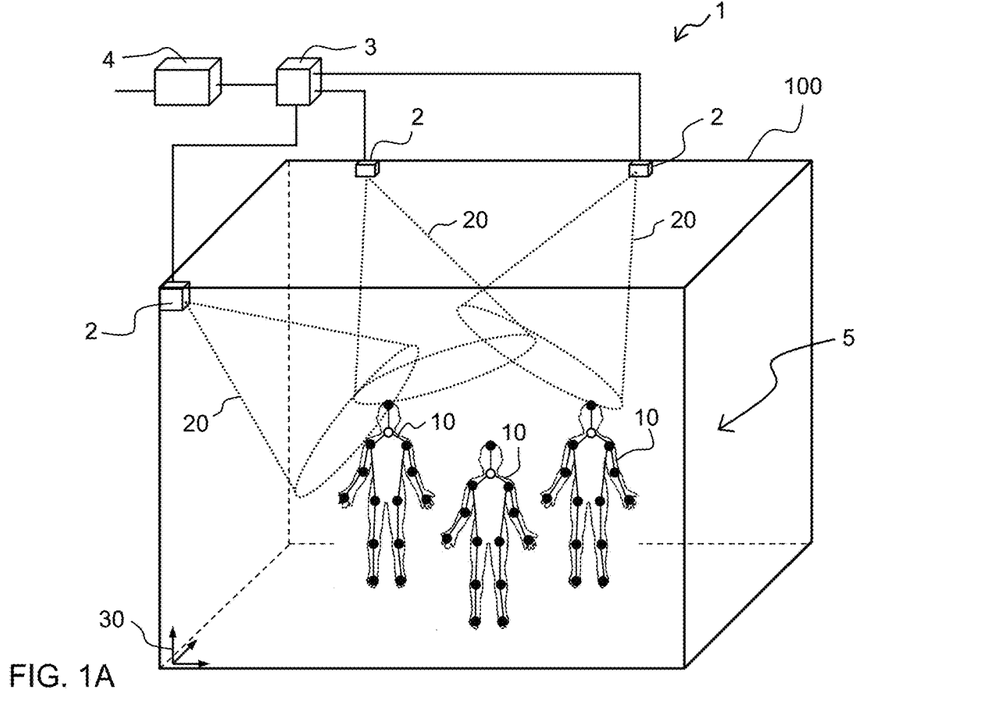
FIG. 1A is a perspective view of an installation of a monitoring system in a room, FIG. 1B exemplifies object detection data (ODD) generated in the system, FIG. 1C exemplifies keypoints detected for a human object.

FIG. 1A shows an example arrangement of a monitoring system 1 in accordance with an embodiment. The system 1 is arranged to monitor a scene 5 in a room 100. In the illustrated example, three individuals 10 are in the room 100. The system 1 comprises a plurality of imaging devices 2, for example digital cameras, which are oriented with their respective field of view 20 towards the scene 5. The scene 5 is associated with a fixed 3D coordinate system 30 ("scene coordinate system"). The imaging devices 2 may be fixed or moveable, and their relative positions and orientations are known for each image taken. The imaging devices 2 may be synchronized to capture a respective image at approximately the same time, or at least with a maximum time difference which depends on the expected maximum speed of movement of the objects 10. In one example, a maximum time difference of 0.1-0.5 seconds may provide sufficient accuracy for normal human motion.

The images captured by the imaging devices 2 are received by a detection device 3, which is configured to determine one or more keypoints of one or more objects in the respective image. The detection device 3 may implement any conventional object detection technique for identifying objects of a generic or specific type in the respective image and may implement any conventional feature detection technique for identifying one or more keypoints of the respective object, for example any of the feature and object detection techniques mentioned hereinabove. The detection device may also preprocess the incoming images, for example for noise reduction, contrast enhancement, etc. In an alternative configuration, the monitoring system 1 comprises a plurality of detection devices 3, for example one for each imaging device 2, where the detection devices 3 may be co-located or integrated with the imaging devices 2.

Figure 1B:
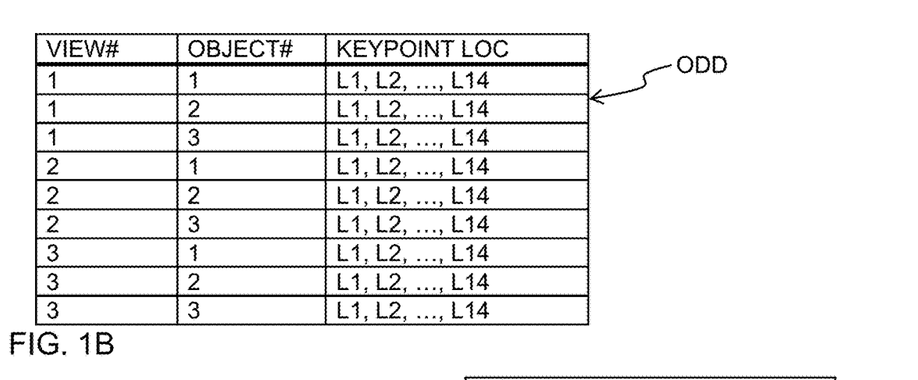
Figure 1C:
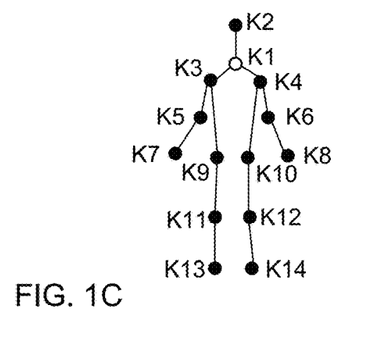

The detection device 3 produces object detection data, which identifies one or more keypoints of one or more objects detected in the respective image. The object detection data is denoted ODD in the following. An example of the ODD is shown in FIG. 1B. Although FIG. 1B illustrates a table, the ODD may be given in any format. In the illustrated example, the ODD represents each image (view) by a respective view identifier (1-3 in FIG. 1B) and each object by a respective object identifier (1-3 in FIG. 1B), and comprises a keypoint position for each keypoint detected for the respective object (L1-L14 in FIG. 1B). In the following, for clarity of presentation, object identifiers will be designated O1, O2, O3, etc., and view identifiers will be designated V1, V2, V3, etc. An example of keypoints K1-K14 that may be detected for a human individual is shown in FIG. 1C. However, any number of keypoints may be detected depending on implementation. One or more of the keypoints may be designated as a main keypoint. The main keypoint may be identifiable with greater accuracy than other key points and/or may have a specific location within the object, for example close to its center. In the schematic example of FIG. 1C, the main keypoint K1 is indicated by an open circle and corresponds to the neck of the respective individual.

Figure 1D:
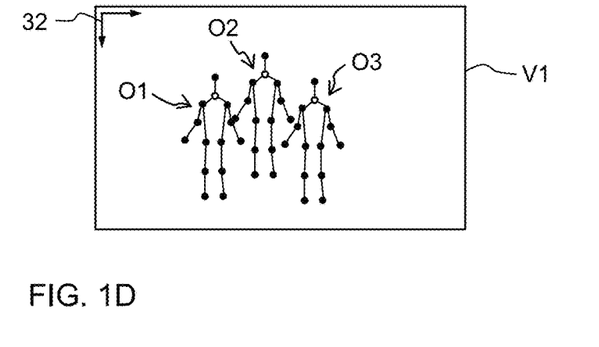
FIG. 1D illustrates a view of one of the cameras in the system onto the scene.

The detection device 3 is configured to detect a predefined number of keypoints of the respective object. If a keypoint is not detected, the detection device 3 may enter a predefined value (for example, a null value) into the ODD. The detection device 3 may also include a confidence score for each object and/or keypoint in the ODD, the confidence score representing a level of certainty for the respective detection. FIG. 1D shows an example view (image) V1 captured by one of the imaging devices 2 in FIG. 1A and represents three detected objects O1, O2 and O3 with associated keypoints. The detected position of the respective keypoint is given by 2D coordinates in a local and fixed coordinate system 32 of the view V1.

The system 1 further comprises a positioning device 4, which is configured to operate on the ODD to compute, and possibly track over time, one or more 3D positions of one or more objects in the scene 5. Embodiments of the positioning device 4 and the processing therein will be described in detail further below.

Figure 2A:
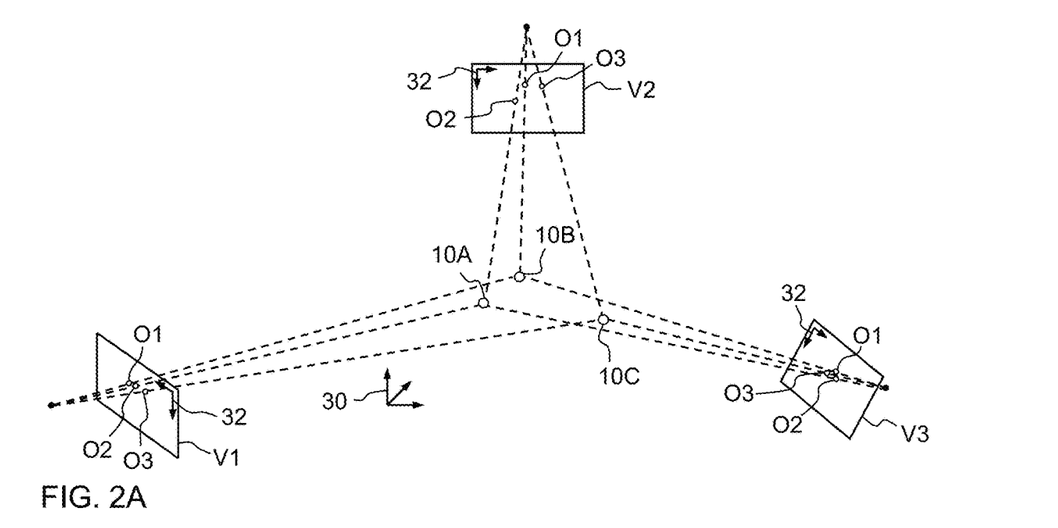
FIG. 2A illustrates a theoretical detection of three objects by a monitoring system.

FIG. 2A illustrates an ideal process of computing 3D positions 10A, 10B, 10C in the scene coordinate system 30 based on detected objects O1, O2, O3 in three views V1-V3. Each object O1-O3 in the respective view V1-V3 may be represented by the main keypoint (K1 in FIG. 1C). The position of the objects (main keypoints) is given in the local coordinate system 32 of the respective view V1-V3. FIG. 2A presumes that the ODD has been processed to identify corresponding objects O1-O3 between the views V1-V3. Generally, no inference can be drawn that the object identifiers match between the views, but a dedicated matching process needs to be performed to identify corresponding objects between the views. The example of FIG. 2A presumes that the objects O1, O2 and O3, respectively, are associated between the views. Since the relative location and orientation of the imaging devices 2 are known, a respective 3D position 10A-10C in the scene coordinate system 30 may be computed based on the detected positions of the objects O1-O3 in the local coordinate system 32 of the respective view V1-V3, for example by conventional triangulation and based on the known relative positions and orientations of the imaging devices 2 (and thus between the views V1-V3). For example, epipolar geometry may be used.

The process in FIG. 2A is sensitive to inaccuracies in the ODD, for example slight inaccuracies in the detected location of the respective object O1-O3 in the respective view V1-V3.

Figure 2B:
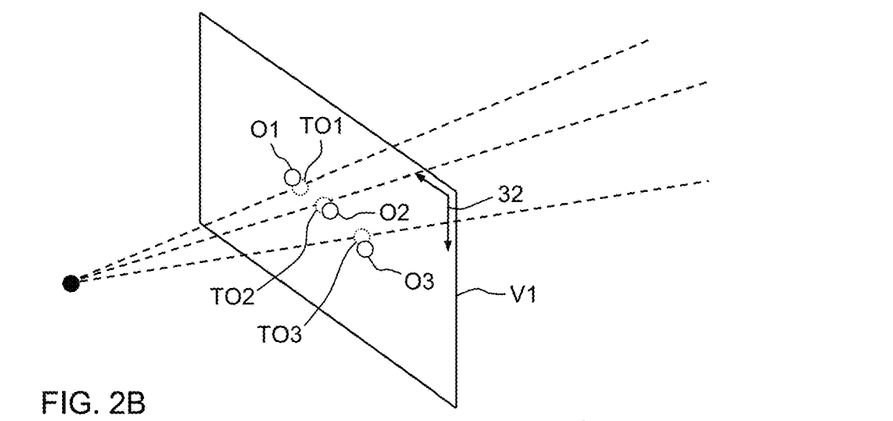
FIGS. 2B-2C illustrate the impact of detection errors on reconstructed 3D object positions.
Figure 2C:
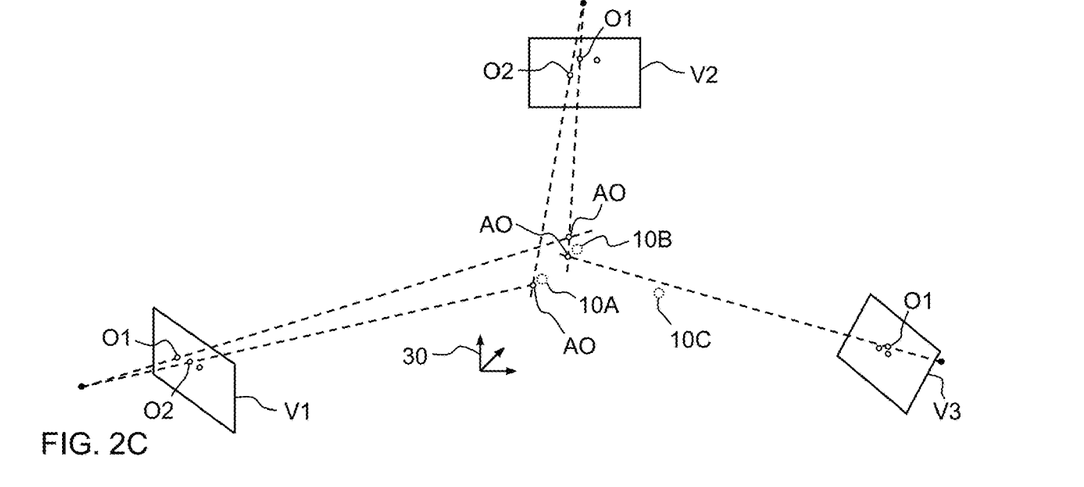

FIG. 2B illustrates three detected objects O1-O3 in view V1. Due to disturbances in the imaging process, for example noise, tolerances, vibrations, temperature changes, etc., the detected locations of the objects O1-O3 may be slightly displaced from the theoretical locations of the objects in the view V1. The theoretical object locations are indicated by dotted circles and designated TO1-TO3 in FIG. 2B. By comparing FIGS. 2A-2B, it is realized that the ideal process in FIG. 2A presumes that the triangulation is based on the theoretical object locations TO1-TO3. FIG. 2C exemplifies the computation of 3D positions in the scene coordinate system 30 for some of the detected objects O1, O2, O3 in the presence of disturbances. Specifically, FIG. 2C indicates a few apparent positions AO that result from triangulation of detected objects between pairs of views, in this example between O1 in V1 and O1 in V2, between O2 in V1 and O2 in V2 and between O1 in V2 and O1 in V3. In FIG. 2C, the true 3D positions are indicated by dotted circles. As understood, if 3D positions are computed for pairs of objects between the views, the resulting 3D positions will exceed the true 3D positions 10A-10C in number and will be scattered around the true 3D positions. Since the distance between the imaging devices 2 and the scene 5 may be large, small disturbances in the views may result in significant deviations of the resulting 3D positions from the true 3D positions. Thus, the inevitable disturbances make it difficult to accurately compute 3D positions from multiple views. Further, the disturbances may cause the matching process to incorrectly match objects between views. It is also conceivable that the disturbances cause the detection device 3 to make an incorrect assignment of a keypoint to an object and/or of a position to a keypoint, so that the ODD contains unforeseeable errors.

The embodiments described in the following increases the robustness to the above-described disturbances and implements a methodology of processing the ODD for generation of 3D positions in the scene coordinate system 30 which is deterministic and applicable irrespective of the nature or type of the objects that are represented by the ODD.

Figure 3A:
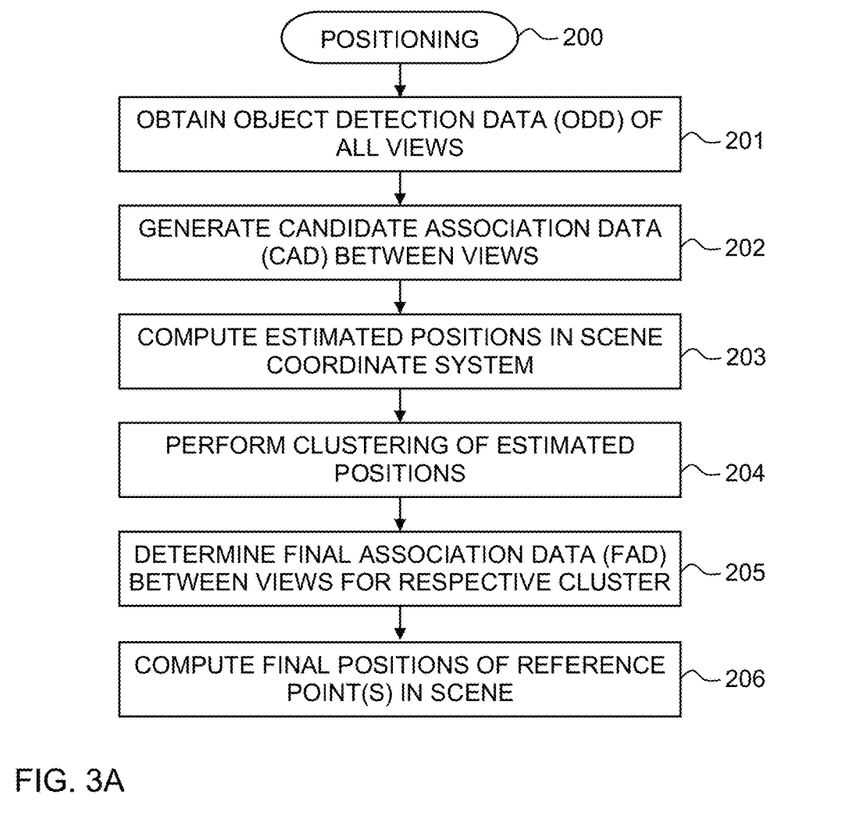
FIGS. 3A-3C are flow charts of methods in accordance with embodiments.

FIG. 3A is a flow chart of a positioning method 200 that may be implemented by the positioning device 4 in FIG. 1A. In step 201, the ODD is obtained, for example from the detection device 3. As noted above, the ODD is indicative, for each view, of the detected objects and the location of one or more keypoints of the respective object.

In step 202, the ODD is processed to generate candidate association data (abbreviated CAD), which associates pairs of objects between the views of the scene. Thus, step 202 identifies the correspondence between objects in pairs of views. The CAD may be any suitable data structure that designates associated pairs of objects. In the simplified example of FIG. 2C, step 202 may generate the CAD to include the following associated pairs of objects: (O1,V1)-(O1,V2), (O2,V1)-(O2,V2), (O3,V1)(O3,V2), (O1,V2)-(O1,V3), (O2,V2)-(O2,V3), (O3,V2)-(O3,V3), (O1,V1)-(O1,V3), (O2,V1)-(O2,V3), (O3,V1)-(O3,V3). Any suitable association evaluation technique may be used. In one non-limiting example, step 202 evaluates each pair of views for correspondence between objects based on a spatial matching criterion, which represents the spatial similarity between the objects. For example, the spatial matching criterion may evaluate the location of one or more keypoints of an object in one view in relation to the location of one or more keypoints of an object in another view. The spatial matching criterion may be based on or include the symmetric epipolar distance, the reprojection error, or any similar measure for comparing images. Such measures are well-known and available to the person skilled in the art. The spatial matching criterion may include the above-mentioned confidence score, if included in the ODD. The spatial matching criterion may be calculated only for one keypoint of each object, for example a main keypoint, or for a plurality of keypoints of each object, for example as a (weighted) aggregation of distances or errors. It may be noted that by the association of two objects in the CAD, the keypoints of the two objects are also inherently associated in pairs. For example, the association (O1,V1)-(O1,V2) implies that L1 of (O1,V1) corresponds to L1 of (O1,V2), L2 of (O1,V1) corresponds to L2 of (O1,V2), and so on.

In step 203, a plurality of estimated positions is computed in the scene coordinate system 30 for associated pairs of objects in the CAD. Each estimated position is thus a 3D position in the scene ("estimated 3D position"). Step 203 may involve processing each pair of objects in the CAD to calculate a respective 3D position for one or more associated keypoints. In one example, the 3D position is calculated by use of conventional triangulation, for example based on epipolar geometry. Step 203 may also involve a spatial filtering which comprises comparing the 3D positions to the spatial limits of the scene 5 and removing any 3D position that falls outside the spatial limits. Further, the pairs of objects or keypoints that yield such a 3D position may be removed from the CAD. In the example of FIG. 2C, the points AO represents some of the 3D positions that are computed by step 203.

Step 203 may compute the estimated 3D positions for only one keypoint of each object, for example a main keypoint, or for a plurality of keypoints of each object. The computational complexity increases with an increasing number of estimated 3D positions and it may be advantageous to compute the plurality of estimated 3D positions for a subset of the available keypoints of the respective object. In fact, adequate performance may be achieved by using only the main keypoints in step 203.

In step 204, a clustering algorithm is operated on estimated 3D positions from step 203, including at least one estimated 3D position for each object, to determine one or more clusters of estimated 3D positions. The clustering algorithm is operated to determine the respective cluster as a subspace of locally increased density of estimated 3D positions. The clustering algorithm may be any type of density-based clustering, including but not limited to DBScan, OPTICS, mean-shift, etc. The clustering in step 204 accounts for the above-described scattering of 3D positions caused by the disturbances (FIGS. 2B-2C) by grouping the scattered 3D positions into clusters. Further, the clustering makes it possible to remove spurious data, for example clusters containing one or only a few 3D positions, from further processing to potentially improve both speed and accuracy. Thus, step 204 may render the method 200 more robust to disturbances.

Step 205 generates, based on the estimated 3D positions in one or more of the clusters determined by step 204, final association data (abbreviated FAD) which associates one or more objects between the views of the scene. The FAD may be any suitable data structure that designates associated objects between the views. It should be noted that the FAD may designate associated objects between more than two views. In the simplified example of FIG. 2C, step 205 may generate the FAD to include the following associations: (O1,V1)-(O1,V2)-(O1,V3), (O2,V1)-(O2,V2)-(O2,V3), (O3,V1)-(O3,V2)-(O3,V3). Step 205 may evaluate the originating pair of objects for each 3D position in a cluster, as given by the CAD, for example by use of an optimization algorithm to seek for at least one object in each view that is sufficiently consistent with the 3D positions in the cluster. It is to be understood that a cluster may correspond to more than one object in a view, for example as a result of crowding, and that an object may be missing in a view, for example as a result of occlusion. By operating on individual clusters in step 205, the determination of the FAD is greatly facilitated and erroneous associations are suppressed, even in the presence of crowding or occlusion. Different implementation examples of step 205 will be described below with reference to FIGS. 3B-3C.

In step 206, final 3D positions in the scene coordinate system 30 are computed for one or more keypoints of the objects that are associated according to the FAD. In one example, the respective final 3D position is calculated by triangulation, for example based on epipolar geometry. If there are more than two views, the triangulation will be overdetermined, which will further reduce the impact of disturbances. Step 206 may thus comprise combining, between the views of the scene and in accordance with the FAD, locations of one or more keypoints of the associated objects, and operating a position calculation function on the combined locations to generate the final 3D positions. The position calculation function may comprise any conventional triangulation or reconstruction algorithm, including but not limited to mid-point method, direct linear transformation, use of essential and/or fundamental matrix, etc. The final 3D positions from step 206 provides a 3D position determination of an object in the scene 5. If the final 3D positions correspond to more than one keypoint for an object, step 206 also provides an 3D pose determination of the object.

It is realized that steps 201-206 may be repeated at consecutive time steps, for example when the detection device 3 operates on video streams from the imaging devices 2 (FIG. 1A). Any conventional tracking algorithm may operate on the final 3D positions generated by step 206 at the consecutive time steps to track the motion of one or more objects or keypoints over time.

Figure 3B:
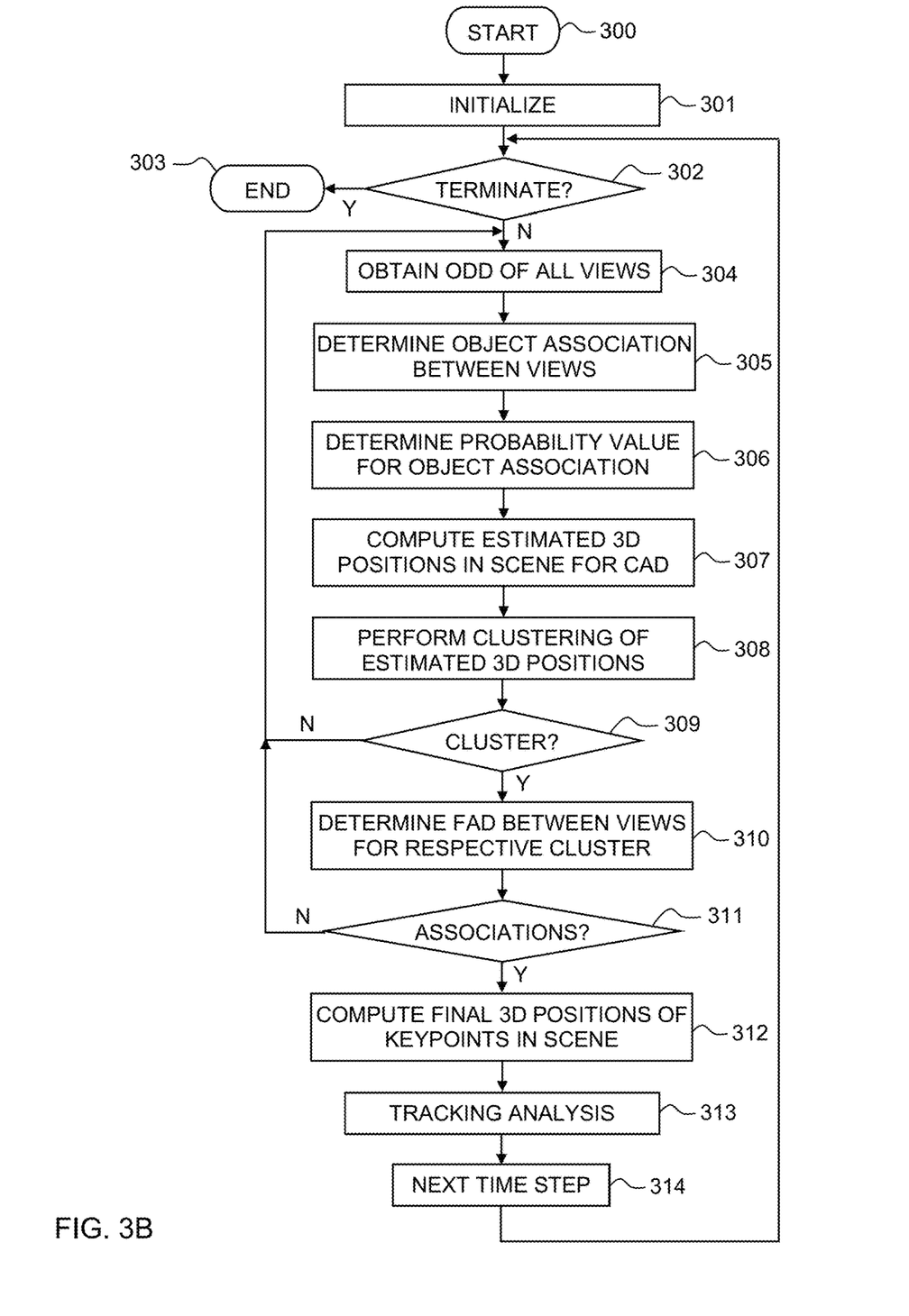
Figure 3C:
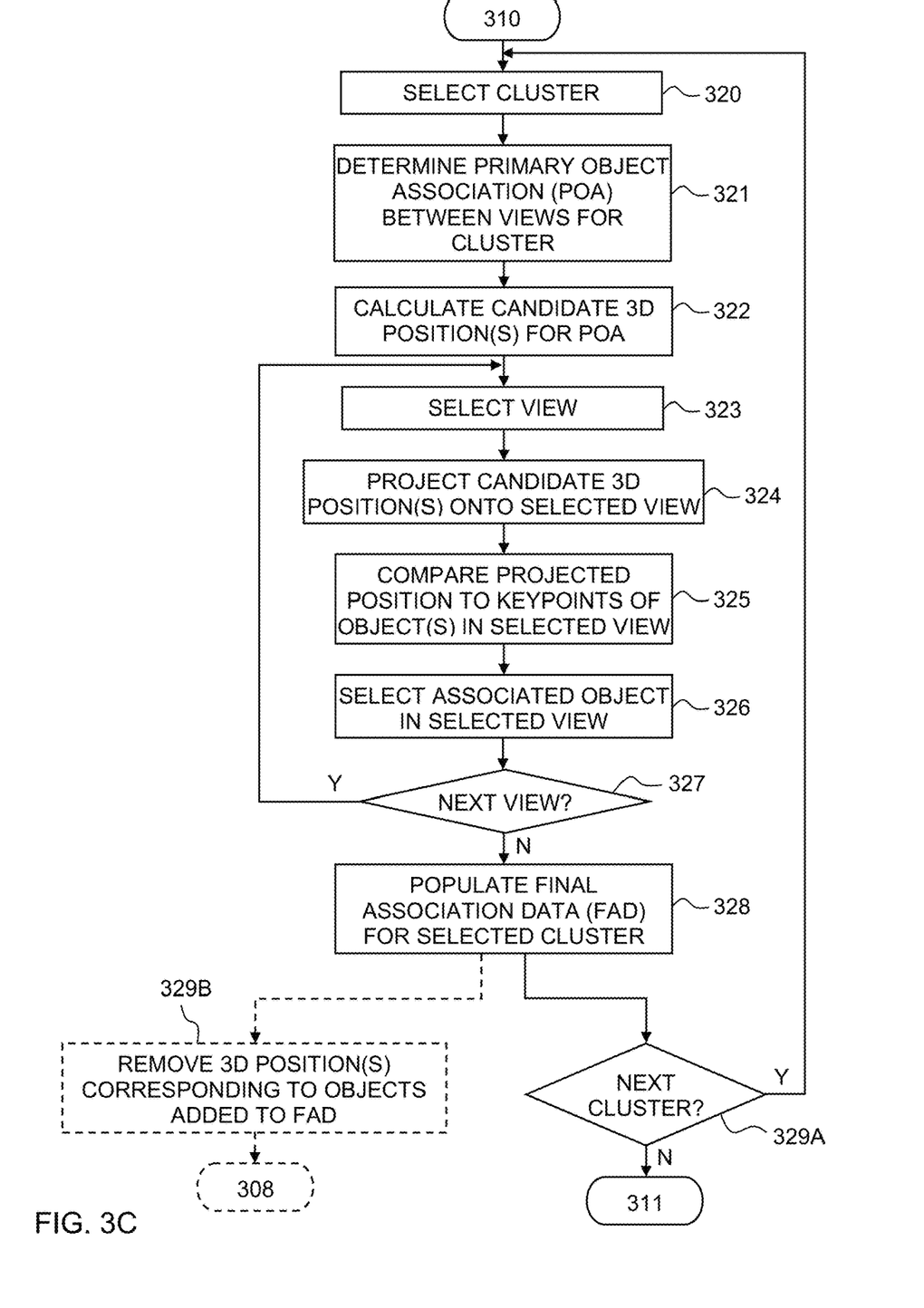

The steps of the method 200, as well as additional steps, will be further exemplified with reference to a method that is represented by flowcharts in FIGS. 3B-3C. When started (step 300), the method proceeds to initialize various parameters, including the data structures for the CAD and the FAD. The method then repeatedly performs steps 302-314, until step 302 detects a termination instruction, which causes the method to end (step 303). The termination instruction may correspond to a signal indicative of an error in the execution of the method or a user-initiated termination.

Step 304 corresponds to step 201 and involves obtaining the ODD, and step 305 corresponds to step 202 and involves populating the CAD. In one embodiment, step 305 determines a candidate correspondence of one or more objects between pairs of views among the available views and generates the CAD to represent the candidate correspondence by associating object identifiers between the pairs of views. As understood from the foregoing, the CAD may also associate keypoints between the pairs of views. In step 306, a probability value is determined for each object pair association in the CAD and added to the CAD. The probability value is generated to represent the likelihood that the association is correct. The probability value may be computed as a function of any conceivable evaluation parameter, for example any one or a combination of the above-mentioned confidence score for the respective object or its keypoints, the above-mentioned spatial matching criterion for the associated objects (reprojection error, symmetric epipolar distance, etc.), a distance between the respective object and objects detected at a preceding time point, etc.

Figure 2D:
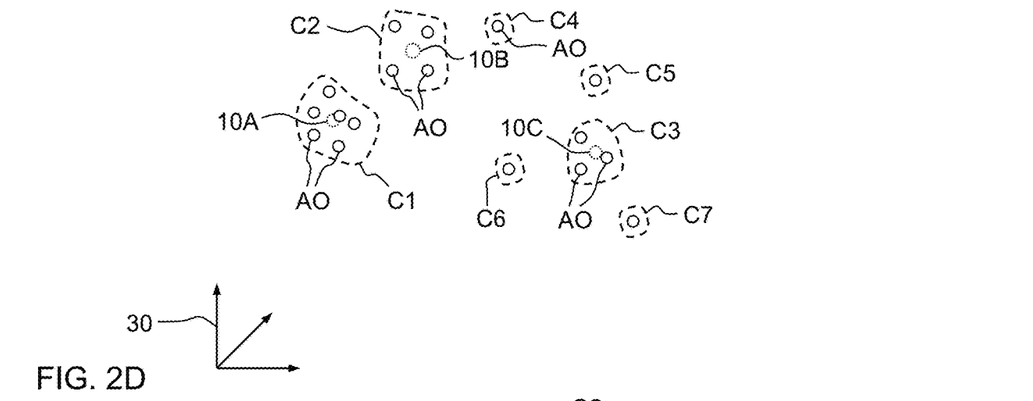
FIG. 2D illustrates clustering of reconstructed 3D object positions.

Step 307 corresponds to step 203 and involves computing, for associated objects in the CAD, estimated 3D positions in the scene coordinate system 30. An example of an ensemble of estimated 3D positions is illustrated in FIG. 2D, where open circles AO represent estimated 3D positions and dotted circles 10A-10C represent the true 3D positions.

Step 308 corresponds to step 204 and involves clustering of the estimated 3D positions from step 307. An example of the resulting clusters is also included in FIG. 2D, where dashed lines delineate the respective cluster C1-C7. As seen, clusters C1-C3 include estimated 3D positions AO that are scattered around the true 3D positions 10A-10C. Step 308 may also comprise removing all clusters for which the included number of estimated 3D positions falls below a threshold, for example 2 or 3. In the example of FIG. 2D, a threshold of 2 would eliminate clusters C4-C7 from further processing.

If step 308 results in at least one cluster, step 309 proceeds to step 310, otherwise it returns to step 304. Step 310 corresponds to step 205 and involves populating the FAD with associations, if any, of one or more objects between the available views. Each association identifies a correspondence of an object between two or more of the available views. Like in step 205, the associations are determined by evaluation of the estimated 3D positions in the respective cluster.

If step 310 results in at least one association, step 311 proceeds to step 312, otherwise it returns to step 304. Step 312 corresponds to step 206 and involves computing, based on the association(s) in the FAD, one or more final 3D positions in the scene coordinate system 30.

Step 313 performs a tracking analysis of the final 3D positions from step 312 to identify a correspondence between final 3D positions over time. Step 313 may involve storing the current final 3D positions in memory, and matching the current final 3D positions to final 3D positions computed (and stored in memory) at one or more preceding time points. It is also conceivable that the tracking analysis is temporally offset and arranged to match the current final 3D positions to final 3D positions computed at one or more succeeding time points, in addition to or instead of final 3D positions computed at one or more preceding time points.

After step 313, step 314 returns the method to perform step 304 at a subsequent time point.

An implementation example of step 310 is represented by a flow chart in FIG. 3C and will be explained with reference to FIGS. 2E-2I. This implementation example handles the situation that the estimated 3D positions in a cluster originate from more than one object in a view.

In step 320, a cluster is selected among the one or more clusters from step 308. The selected cluster may be determined based on any suitable criterion, for example a count of the estimated 3D positions in the respective cluster, or an aggregated probability value for the estimated 3D positions that are included in the respective cluster. Recalling that step 306 may determine a probability value for each object pair in the CAD, this would mean that there is a probability value for each estimated 3D position. In one embodiment, step 320 selects the cluster with the largest weight, for example given by the count or the aggregated probability value.

Figure 2E:
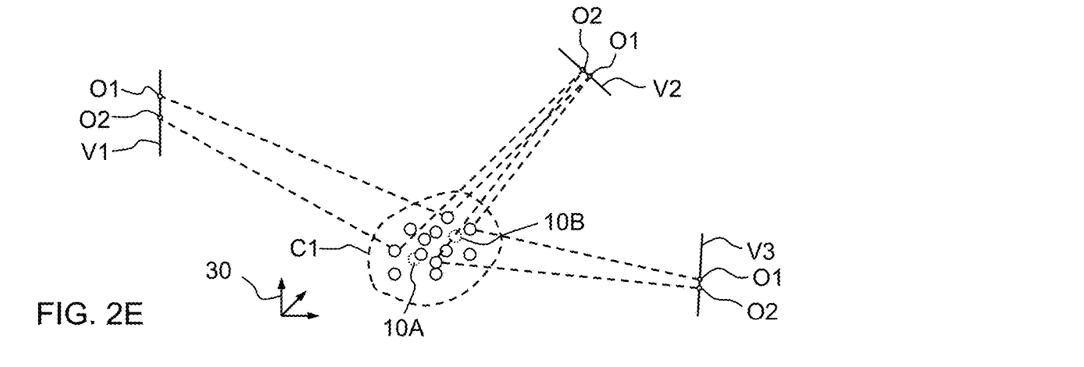
FIGS. 2E-2F illustrate cluster evaluation for object association between views.

Step 321 determines a primary object association (POA) between a group of views for the selected cluster from step 320. The POA identifies a primary object in each view among the group of views, which may be a subset of the available views. Step 321 is exemplified in FIGS. 2E-2F, in which a cluster C1 contains estimated 3D positions (open circles) that at least partly correspond to two true 3D positions 10A, 10B (dotted circles). In one embodiment, step 321 determines the POA to define a consistent association of a single object between all views in the group of views. As used herein, such a "consistent association" results in at least a subset of the estimated 3D positions, given the candidate associations in the CAD. Step 312 may thus evaluate the candidate associations that correspond to the estimated 3D positions to find one object in each view that could render at least a subset of the estimated 3D positions of the cluster. In the example of FIG. 2E, dashed lines indicate some candidate associations, given by the CAD, between two objects O1, O2 in three views V1-V3, where the respective candidate association corresponds to an estimated 3D position (open circle).

Figure 2F:
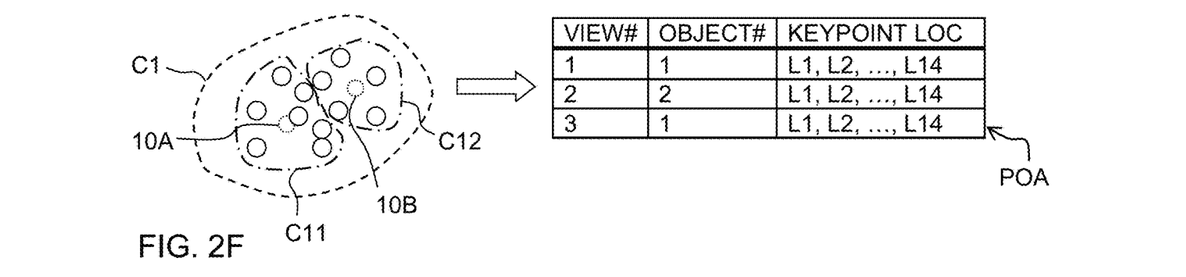
Figure 2G:
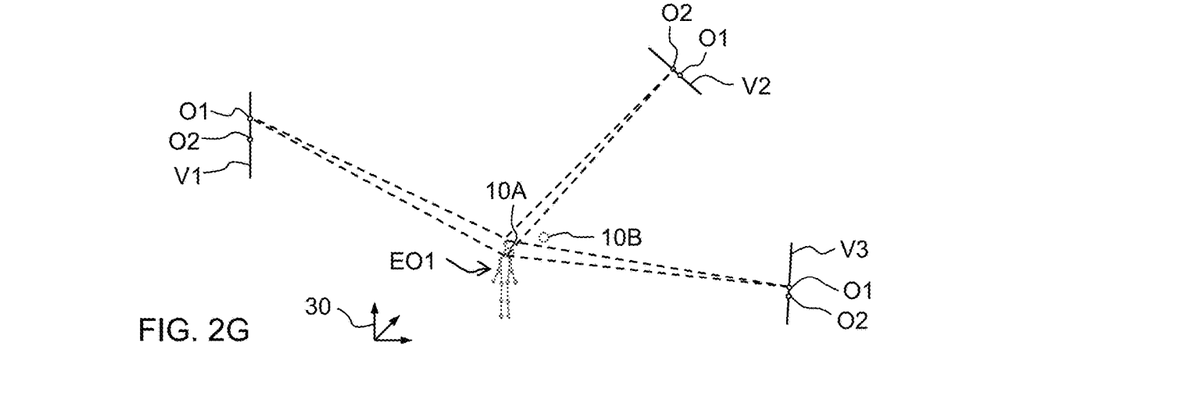
FIGS. 2G-2H illustrate reprojection processing for object association between views.

Step 321 may be implemented to perform an exhaustive search which involves evaluating, in accordance with the CAD, all possible combinations of objects between the views, where each combination results in a respective set of estimated 3D positions, and selecting the best combination among the combinations to form the POA. Step 321 may instead be implemented to find the best combination by use of an optimization algorithm, for example a greedy algorithm. Assuming that each estimated 3D position is assigned a score value, the best combination may be selected to yield the largest aggregation of score values for the set of estimated 3D positions. In one example, the score value is the same for all estimated 3D positions, causing step 312 to select the combination that results in the largest set of estimated 3D positions. In another example, the score value is set in proportion to the above-mentioned probability value. In the example of FIG. 2F, the cluster C1 has been evaluated by step 321. The table in FIG. 2F represents the POA, which thus is (O1,V1)-(O2,V2)-(O1,V3).

In a variant, step 321 is performed before step 320 on all clusters from step 308, and step 320 determines the selected cluster as a function of the aggregated score value of the POA determined by step 321 for the respective cluster. For example, step 320 may select the cluster with the largest aggregated score value.

Step 322 computes at least one candidate 3D position in the scene coordinate system 30 for the POA of the selected cluster. The candidate 3D position may thus be computed for only one keypoint of the object in the respective view, according in the POA, for example a main keypoint, or for a plurality of keypoints of each object. It should be noted that the respective candidate 3D position may differ from the estimated 3D positions, which are computed for objects between pairs of views, since the candidate 3D positions may be computed for objects associated across more than two views. Step 322 may compute the candidate 3D position(s) in the same way that steps 206 and 312 computes the final 3D position. Step 322 may be seen to correspond to a merging of a set of estimated 3D positions which are scattered within a cluster (for example C11 in FIG. 2F) into a candidate 3D position. Step 322 is exemplified in FIG. 2G, where candidate 3D positions are computed for two keypoints of the objects that are associated by the POA in FIG. 2F, for example keypoints K1 and K2 (cf. FIG. 1C). The candidate 3D positions thereby form a representation of an estimated object EO1 in the scene.

Figure 2H:
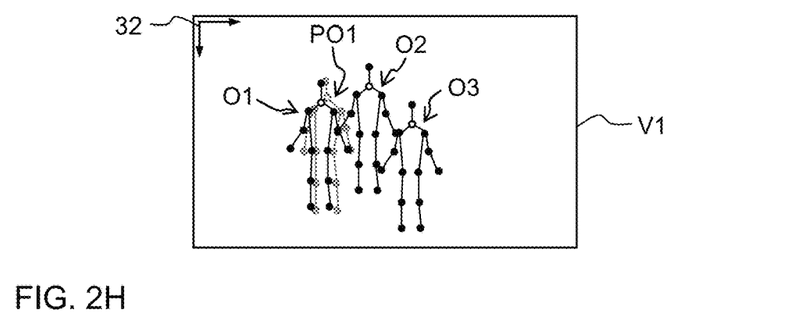

Step 323 selects one of the views that are included in the POA, and step 324 projects the candidate 3D position(s) from step 322 onto the selected view to generate corresponding projected 2D position(s) in the local coordinate system 32 of the selected view. Step 325 matches the projected 2D position(s) to the locations of the keypoints of the respective object in the selected view, according to the ODD, and evaluates a comparison score for the respective object. The comparison score thus generally represents a similarity between the projected 2D position(s) and the location of corresponding keypoint(s) of the respective object. The comparison score is computed by a comparison function, including but not limited to a sum of distances between corresponding projected positions and keypoints in the selected view, Object Keypoint Similarity (OKS), Percentage of Correct Keypoints (PCK), Intersection over Union (IoU) between bounding boxes, or any other conventional function for comparing two sets of positions. Step 326 selects the comparison score that indicates the highest similarity and compares it to a threshold value. If the similarity is deemed sufficient, step 326 selects the related object for entry as an associated object in the FAD, otherwise no associated object is selected. It is realized that the accuracy of step 326 may be improved by steps 324-325 operating on a plurality of candidate 3D positions. FIG. 2H illustrates a projected object PO1 comprising a full set of projected 2D positions in the view V1 of FIG. 1D. Clearly, step 326 will select object O1 with high certainty.

Step 327 repeats steps 323-326 for all views that are included in the POA, and step 328 populates the FAD with a set of associated objects for the selected cluster. Step 328 may also remove the set of associated objects from the ODD.

The flowchart in FIG. 3C depicts two alternative processing paths after step 328.

Figure 2I:
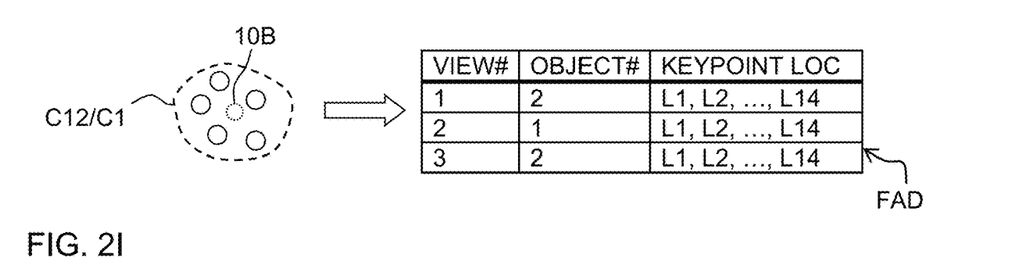
FIG. 2I illustrates a further cluster evaluation subsequent to the cluster evaluation in FIG. 2E.

In a first processing path, the method may proceed to step 329A which checks if there is at least one additional cluster to process among the clusters from step 308. If so, the method is returned to step 320 for selecting a cluster among the additional cluster(s), otherwise the method proceeds to step 311. Optionally, the first processing path may comprise an additional step before step 329A that removes the set of estimated 3D positions that corresponds to the POA (cf. sub-cluster C11) from the latest selected cluster and forms a new cluster that contains any remaining estimated 3D positions in the latest selected cluster. In the example of FIG. 2F, the new cluster would correspond to sub-cluster C12. As shown in FIG. 2I, the cluster C12 may eventually be processed by steps 321-328, which may result in the POA represented by a table in FIG. 2I: (O2,V1)-(O1,V2)-(O2,V3).

In a second processing path, indicated by dashed lines in FIG. 3C, the method proceeds to step 329B which updates the plurality of estimated 3D positions (computed by step 308 at the current time point) and proceeds to step 308, which performs clustering of the updated plurality of estimated 3D positions. In one embodiment, the updating in step 329B comprises identifying, among the plurality of estimated 3D positions, a first set of estimated 3D positions that correspond to the objects added to the FAD by step 328, and removing the first set of estimated 3D positions from the plurality of estimated 3D positions. The second processing path thus repeats the clustering for remaining estimated 3D positions. This repeated clustering may allow the subsequent processing to reveal hidden relations between the objects in the images. The foregoing is equivalent to removing, from the CAD, all associations comprising the objects that were added to the FAD by step 328, and proceeding to step 307, but eliminates the need to re-compute the estimated 3D positions for the remaining associations in the CAD.

Optionally, step 329B may also compute a set of final 3D positions for the objects that were added to the FAD by step 328 and use the set of final 3D positions for updating the plurality of estimated 3D positions. In one embodiment, the updating in step 329B further comprises identifying a second set of estimated 3D positions which are located within a predefined distance from the set of final 3D positions, and removing the second set of estimated positions from the plurality of estimated 3D positions. This embodiment has the advantage of removing spurious estimated 3D positions and may thereby reduce the number of clusters that are processed by the method. The foregoing is equivalent to removing, from the CAD, all associations that result in an estimated 3D position located within the predefined distance from the set of final 3D positions, and proceeding to step 307. It may also be noted that step 312 may be omitted in this embodiment, since the final 3D positions are instead computed as part of step 329B.

Figure 4:
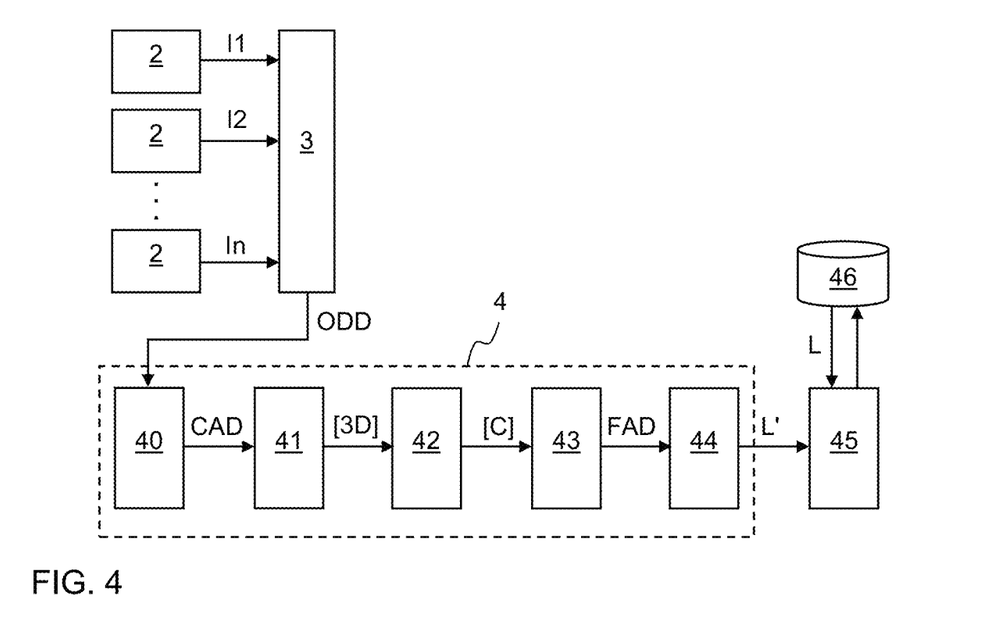
FIG. 4 is a block diagram of a monitoring system in accordance with an embodiment.

FIG. 4 is a block diagram of a monitoring system in accordance with an embodiment. The monitoring system comprises imaging devices 2, which are arranged to generate at least two images I1-In of a scene. The images I1-In are received by a processing device ("detection device") 3, which is configured to process the images I1-In to generate the object detection data (ODD). The ODD is obtained by a monitoring device ("positioning device") 4, which is configured to implement any one of the methods described herein. In the illustrated example, the positioning device 4 comprises first to fifth modules 40-44. The first module 40 is configured to generate the candidate association data (CAD) based on the ODD, for example in accordance with step 202 or steps 305-306. The second module 41 is configured to generate the plurality of estimated 3D positions ([3D]) based on the CAD, for example in accordance with step 203 or step 307. The third module 42 is configured to determine one or more clusters ([C]) for the plurality of estimated 3D positions, for example in accordance with step 204 or step 308. The fourth module 43 is configured to determine final association data (FAD) for the cluster(s), for example in accordance with step 205 or step 310. The fifth module 44 is configured to compute the final 3D positions L' based on the FAD, for example in accordance with step 205 or step 312.

The monitoring system in FIG. 4 also includes a tracking device 45 which may be separate from, as shown, or part of the monitoring device 4. The tracking device 45 may be configured to maintain a tracking list L, which is stored in a memory 46. The tracking list L holds information about objects that are currently detected and tracked. More specifically, for each object, the tracking list L contains current 3D positions of its keypoint(s) and an overall tracking score. The tracking device 45 is configured to update the tracking list L whenever the monitoring device provides L' for a new time point. The tracking device 45 may apply any conventional tracking algorithm to update the tracking list L based on L'. In one example, the tracking device 45 is configured to match objects in L to objects L', for example formulated as a bipartite graph maximum weight matching problem. The tracking device 43 may, for each object in L that is matched to an object in L', update the object's 3D position(s) with those in L' and increase the object's tracking score up to certain limit. The tracking device 43 may further, for each object in L that is not matched to an object in L', reduce the object's tracking score, and if the tracking score drops below certain threshold, remove the object from L. The tracking device 43 may further, for each object in L' that is not matched to an object in L, add the object and its 3D position(s) to L with a default tracking score.

Figure 5:
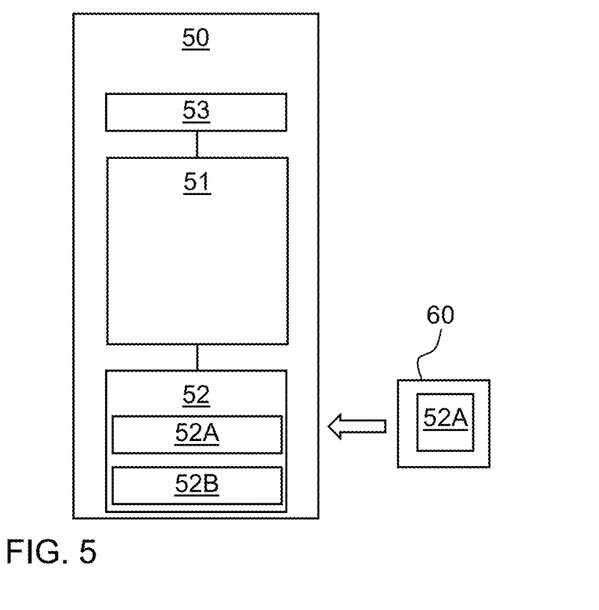
FIG. 5 is a block diagram of a machine that may implement any one of the methods in FIGS. 3A-3C.

The structures and methods disclosed herein may be implemented by hardware or a combination of software and hardware. In some embodiments, such hardware comprises one or more software-controlled computer resources. FIG. 5 schematically depicts such a computer resource 50, which comprises a processing system 51, computer memory 52, and a communication interface 53 for input and/or output of data. The communication interface 53 may be configured for wired and/or wireless communication, including communication with the detection device 3. The processing system 51 may e.g. include one or more of a CPU ("Central Processing Unit"), a DSP ("Digital Signal Processor"), a microprocessor, a microcontroller, an ASIC ("Application-Specific Integrated Circuit"), a combination of discrete analog and/or digital components, or some other programmable logical device, such as an FPGA ("Field Programmable Gate Array"). A control program 51A comprising computer instructions is stored in the memory 52 and executed by the processing system 51 to perform any of the methods, operations, functions or steps exemplified in the foregoing. As indicated in FIG. 5, the memory 52 may also store control data 52B for use by the processing system 52. The control program 52A may be supplied to the computing resource 50 on a computer-readable medium 60, which may be a tangible (non-transitory) product (e.g. magnetic medium, optical disk, read-only memory, flash memory, etc.) or a propagating signal.

The foregoing description has focused on handling a single type of objects. However, it is straight-forward to extend the disclosed technique to processing of images that depict different types of objects, for example by processing each type of object separately. In one example, the detection device 3 may output one ODD for each type of object in an image, and steps 202-206 or steps 305-312 may be operated on each ODD separately. Although the objects are represented as human individuals in the foregoing examples, the disclosed technique is applicable to any type of object, be it living or inanimate, moving or stationary.

The techniques disclosed and exemplified herein have a variety of applications such as 3D vision inspection, product assembly, goods inspection, human-computer interaction, video surveillance, sports broadcasting, industry robot control, navigation, etc. The present Applicant also contemplates to arrange a monitoring system that implements the disclosed technique to track individuals in an exercise situation, for example in a gym. For example, the monitoring system may track how the individuals move around the gym, identify activity and count repetitions by use of the tracked 3D positions of the individuals, for example representing joints of the individuals, and store corresponding exercise data for the respective individual in a database for access by the respective individual or another party. In such a monitoring system, it may be desirable to allow the respective individual to give consent to its exercise data being stored in the database. In one embodiment, such consent is registered when the monitoring system detects that the individual is positioned at a specified location and/or in a specified 3D pose within the scene for a specified time period.

In the following, a set of items are recited to summarize some aspects and embodiments of the invention as disclosed in the foregoing.

Item 1: A method of determining positioning of objects in a scene, said method comprising:

obtaining (201; 304) object detection data corresponding to two-dimensional, 2D, images of the scene, said object detection data comprising an object identifier of a respective object in a respective 2D image among the 2D images of the scene and a location of a respective reference point of the respective object in the respective 2D image;

processing (202; 305-306) the object detection data to generate candidate association data which associates pairs of objects between the 2D images of the scene;

computing (203; 307) a plurality of estimated three-dimensional, 3D, positions in a scene coordinate system of the scene for associated pairs of objects in the candidate association data;

determining (204; 308) one or more clusters of the plurality of estimated 3D positions;

generating (205; 310), based on estimated 3D positions in at least one cluster among the one or more clusters, final association data which associates one or more objects between the 2D images of the scene; and computing (206; 312), based on the final association data, one or more final 3D positions in the scene coordinate system of the scene for one or more reference points of said one or more objects.

Item 2: The method of item 1, wherein said processing (202; 305-306) the object detection data comprises: determining (305) a candidate correspondence of said one or more objects between pairs of 2D images among the 2D images of the scene, and wherein the candidate association data associates object identifiers between said pairs of 2D images to represent the candidate correspondence.

Item 3: The method of item 2, wherein the candidate association data further associates a set of reference points between said pairs of 2D images.

Item 4: The method of any preceding item, wherein said determining (204; 308) the one or more clusters comprises: operating a density-based clustering algorithm on the plurality of estimated 3D positions.

Item 5: The method of any preceding item, wherein said generating (205; 310) the final association data comprises: determining (321) a primary object association between a group of 2D images for said at least one cluster, the primary object association identifying a primary object in each 2D image among the group of 2D images; computing (322), based on the primary object association, at least one candidate 3D position in the scene coordinate system of the scene; and projecting (324) said at least one candidate 3D position onto the group of 2D images to generate at least one projected 2D position on said each 2D image, wherein the final association data is generated based on said at least one projected 2D position on said each 2D image.

Item 6: The method of item 5, wherein said computing (322) the at least one candidate 3D position comprises: computing (322) a plurality of candidate 3D positions for reference points of said primary object in said each 2D image, wherein said projecting (324) results in projected 2D positions on said each 2D image, and wherein said generating (205; 310) the final association data further comprises: evaluating (325-326) the projected 2D positions on said each 2D image in relation to reference points of the respective object in said each 2D image, wherein the final association data is generated based on said evaluating (325-326).

Item 7: The method of item 6, wherein said evaluating (325-326) the projected 2D positions comprises: computing (325) a comparison score for the projected 2D positions on said each 2D image in relation to the reference points of the respective object in said each 2D image; selecting (326), based on the comparison score, objects in the group of 2D images and including, in the final association data, an association between thus-selected objects in the group of 2D images.

Item 8: The method of item 7, wherein said generating (205; 310) the final association data further comprises: identifying, among the plurality of estimated 3D positions, a first set of estimated 3D positions that correspond to said association between the thus-selected objects; generating (329B) an updated plurality of estimated 3D positions by removing the first set of estimated 3D positions from the plurality of estimated 3D positions; and repeating said determining (204; 308) the one or more clusters and said generating (205; 310) the final association data for the updated plurality of estimated 3D positions.

Item 9: The method of item 8, wherein said generating (205; 310) the final association data further comprises: identifying a second set of estimated 3D positions which are located within a predefined distance from the one or more final 3D positions computed based on the final association data, wherein said generating (329B) the updated plurality of estimated 3D positions further comprises: removing the second set of estimated 3D positions from the plurality of estimated 3D positions.

Item 10: The method of any one of items 5-9, wherein the primary object association defines a consistent association of one object between the 2D images in the group of 2D images.

Item 11: The method of any one of items 5-10, wherein said determining (321) the primary object association comprises: evaluating the estimated 3D positions in said at least one cluster to select a set of estimated 3D positions that originate from a single object in each 2D image among the group of 2D images, wherein the primary object association identifies the single object in each 2D image among the group of 2D images.

Item 12: The method of item 11, wherein said computing (203; 307) the plurality of estimated 3D positions comprises: assigning a score value to each estimated 3D position in the plurality of estimated 3D positions, wherein the set of estimated 3D positions is selected to optimize an aggregation of score values while ensuring that the set of estimated 3D positions originates from one object in said each 2D image in the group of 2D images.

Item 13: The method of item 12, wherein the score value is a probability value assigned by said processing (202; 305-306) the object detection data.

Item 14: The method of any preceding item, wherein the respective object among the associated objects in the candidate association data is assigned a plurality of reference points, and wherein said computing (203; 307) the plurality of estimated 3D positions is performed for a subset of the plurality of reference points of the respective object among the associated objects in the candidate association data.

Item 15: The method of any preceding item, wherein said computing (206; 312) the one or more final 3D positions comprises: combining, between the 2D images of the scene and in accordance with the final association data, locations of said one or more reference points of said one or more objects, and operating a position calculation function on the thus-combined locations to generate the one or more final positions.

Item 16: The method of any preceding item, wherein the respective 2D image comprises a 2D digital image, and wherein said location of the respective reference point of the respective object in the respective 2D image is given in a local coordinate system with a fixed relation to the 2D digital image.

Item 17: The method of item 16, further comprising: obtaining 2D digital images captured by imaging devices facing the scene; and processing the 2D digital images to generate said object detection data.

Item 18: The method of any preceding item, further comprising: matching (313) the one or more final 3D positions to one or more final 3D positions computed at one or more preceding time points and/or at one or more succeeding time points to track said one or more objects as a function of time.

Item 19: A computer-readable medium comprising computer instructions (54) which, when executed by a processing system (51), cause the processing system (51) to perform the method of any preceding item.

Item 20: A monitoring device configured to determine positioning of objects (10) in a scene (5), said monitoring device comprising logic (51, 52) configured to control the monitoring device to:

obtain object detection data (ODD) corresponding to two-dimensional, 2D, images (V1-V3) of the scene (5), said object detection data (ODD) comprising an object identifier of a respective object in a respective 2D image among the 2D images (V1-V3) of the scene (5) and a location of a respective reference point (L1-L14) of the respective object (10) in the respective 2D image (V1-V3);

process the object detection data (ODD) to generate candidate association data (CAD) which associates objects between the 2D images (V1-V3) of the scene (5);

compute a plurality of estimated three-dimensional, 3D, positions in a scene coordinate system (30) of the scene (5) for associated objects in the candidate association data (CAD);

determine one or more clusters (C1-C7) of the plurality of estimated 3D positions;

generate, based on estimated 3D positions in at least one cluster among the one or more clusters (C1-C7), final association data (FAD) which associates one or more objects between the 2D images (V1-V3) of the scene (5); and compute, based on the final association data (FAD), one or more final 3D positions in the scene coordinate system (30) of the scene (5) for one or more reference points (L1-L14) of said one or more objects.

Item 21: A monitoring system, comprising:
 at least two imaging devices (2) for distributed arrangement in relation to a scene (5) and configured to produce two-dimensional, 2D, images (V1-V3) of the scene (5);
 a processing device (3) configured to receive and process the 2D images (V1-V3) to generate object detection data (ODD) corresponding to the 2D images (V1-V3) of the scene (5); and
 the monitoring device in accordance with item 20.

The invention claimed is:

1. A method of determining positioning of objects in a scene, said method comprising:
 obtaining object detection data corresponding to two-dimensional, 2D, images of the scene, said object detection data comprising an object identifier of a respective object in a respective 2D image among the 2D images of the scene and a location of a respective reference point of the respective object in the respective 2D image;
 processing the object detection data to generate candidate association data which associates pairs of objects between the 2D images of the scene;
 computing a plurality of estimated three-dimensional, 3D, positions in a scene coordinate system of the scene for associated pairs of objects in the candidate association data;
 determining one or more clusters of the plurality of estimated 3D positions;
 generating, based on estimated 3D positions in at least one cluster among the one or more clusters, final association data which associates one or more objects between the 2D images of the scene; and
 computing, based on the final association data, one or more final 3D positions in the scene coordinate system of the scene for one or more reference points of said one or more objects, and
 wherein said generating the final association data comprises:
  identifying, among the plurality of estimated 3D positions a first set of estimated 3D positions, the first set of estimated 3D positions identified using a primary object association between a group of 2D images for said at least one cluster, and generating an updated plurality of estimated 3D positions by removing the first set of estimated 3D positions; and
  identifying a second set of estimated 3D positions which are located within a predefined distance from the one or more final 3D positions, wherein said generating the updated plurality of estimated 3D positions further comprises removing the second set of estimated 3D positions from the plurality of estimated 3D positions.

2. The method of claim 1, wherein said processing the object detection data comprises: determining a candidate correspondence of said one or more objects between pairs of 2D images among the 2D images of the scene, and wherein the candidate association data associates object identifiers between said pairs of 2D images to represent the candidate correspondence.

3. The method of claim 2, wherein the candidate association data further associates a set of reference points between said pairs of 2D images.

4. The method of claim 1, wherein said determining the one or more clusters comprises: operating a density-based clustering algorithm on the plurality of estimated 3D positions.

5. The method of claim 1, wherein said generating the final association data comprises: determining the primary object association between a group of 2D images for said at least one cluster, the primary object association identifying a primary object in each 2D image among the group of 2D images;
 computing, based on the primary object association, at least one candidate 3D position in the scene coordinate system of the scene; and projecting said at least one candidate 3D position onto the group of 2D images to generate at least one projected 2D position on said each 2D image, wherein the final association data is generated based on said at least one projected 2D position on said each 2D image.

6. The method of claim 5, wherein said computing the at least one candidate 3D position comprises: computing a plurality of candidate 3D positions for reference points of said primary object in said each 2D image, wherein said projecting results in projected 2D positions on said each 2D image, and wherein said generating the final association data further comprises: evaluating the projected 2D positions on said each 2D image in relation to reference points of the respective object in said each 2D image, wherein the final association data is generated based on said evaluating.

7. The method of claim 6, wherein said evaluating the projected 2D positions comprises: computing a comparison score for the projected 2D positions on said each 2D image in relation to the reference points of the respective object in said each 2D image; selecting, based on the comparison score, objects in the group of 2D images and including, in the final association data, an association between thus-selected objects in the group of 2D images.

8. The method of claim 7, wherein said generating the final association data further comprises: identifying, among the plurality of estimated 3D positions, the first set of estimated 3D positions such that the first set of estimated 3D positions correspond to said association between the thus-selected objects; and repeating said determining the one or more clusters and said generating the final association data for the updated plurality of estimated 3D positions.

9. The method of claim 5, wherein the primary object association defines an association of one object between the 2D images in the group of 2D images.

10. The method of claim 5, wherein said determining the primary object association comprises: evaluating the estimated 3D positions in said at least one cluster to select a set of estimated 3D positions that originate from a single object in each 2D image among the group of 2D images, wherein the primary object association identifies the single object in each 2D image among the group of 2D images.

11. The method of claim 10, wherein said computing the plurality of estimated 3D positions comprises: assigning a score value to each estimated 3D position in the plurality of estimated 3D positions, wherein the set of estimated 3D positions is selected to optimize an aggregation of score values while ensuring that the set of estimated 3D positions originates from one object in said each 2D image in the group of 2D images.

12. The method of claim 11, wherein the score value is a probability value assigned by said processing the object detection data.

13. The method of claim 1, wherein the respective object among the associated objects in the candidate association data is assigned a plurality of reference points, and wherein said computing the plurality of estimated 3D positions is performed for a subset of the plurality of reference points of the respective object among the associated objects in the candidate association data.

14. The method of claim 1, wherein said computing the one or more final 3D positions comprises: combining, between the 2D images of the scene and in accordance with the final association data, locations of said one or more reference points of said one or more objects, and operating a position calculation function on the thus-combined locations to generate the one or more final positions.

15. The method of claim 1, wherein the respective 2D image comprises a 2D digital image, and wherein said location of the respective reference point of the respective object in the respective 2D image is given in a local coordinate system with a fixed relation to the 2D digital image.

16. The method of claim 15, further comprising: obtaining 2D digital images captured by imaging devices facing the scene; and processing the 2D digital images to generate said object detection data.

17. The method of claim 1, further comprising: matching the one or more final 3D positions to one or more final 3D positions computed at one or more preceding time points and/or at one or more succeeding time points to track said one or more objects as a function of time.

18. A non-transitory computer-readable medium comprising computer instructions which, when executed by a processing system, cause the processing system to perform the method of claim 1.

19. A monitoring device configured to determine positioning of objects in a scene, said monitoring device comprising logic configured to control the monitoring device to:
obtain object detection data corresponding to two-dimensional, 2D, images of the scene, said object detection data comprising an object identifier of a respective object in a respective 2D image among the 2D images of the scene and a location of a respective reference point of the respective object in the respective 2D image;
process the object detection data to generate candidate association data which associates objects between the 2D images of the scene;
compute a plurality of estimated three-dimensional, 3D, positions in a scene coordinate system of the scene for associated objects in the candidate association data;
determine one or more clusters of the plurality of estimated 3D positions;
generate, based on estimated 3D positions in at least one cluster among the one or more clusters, final association data which associates one or more objects between the 2D images of the scene; and
compute, based on the final association data, one or more final 3D positions in the scene coordinate system of the scene for one or more reference points of said one or more objects,
wherein, to generate said final association data, the monitoring device is further configured to:
identify, among the plurality of estimated 3D positions a first set of estimated 3D positions, the first set of estimated 3D positions identified using a primary object association between a group of 2D images for said at least one cluster, and generate an updated plurality of estimated 3D positions by removing the first set of estimated 3D positions; and
identify a second set of estimated 3D positions which are located within a predefined distance from the one or more final 3D positions, wherein said generation of the updated plurality of estimated 3D positions further comprises removing the second set of estimated 3D positions from the plurality of estimated 3D positions.

* * * * *